US006608893B1

(12) United States Patent
Fleming et al.

(10) Patent No.: US 6,608,893 B1
(45) Date of Patent: Aug. 19, 2003

(54) NETWORKS, SYSTEMS AND METHODS FOR ROUTING DATA TRAFFIC WITHIN A TELEPHONE NETWORK BASED ON AVAILABLE RESOURCES

(75) Inventors: Norman Wayne Fleming, Birmingham, AL (US); James S. Rainwater, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/132,961

(22) Filed: Aug. 12, 1998

(51) Int. Cl.[7] .......................... H04M 7/00; H04L 12/28
(52) U.S. Cl. .................. 379/230; 379/220.01; 379/219; 379/221.01; 370/701; 370/217
(58) Field of Search .................. 379/230, 260, 379/265, 220, 219, 221.01, 265.11; 370/701, 351, 265.11

(56) References Cited

U.S. PATENT DOCUMENTS

| 5,423,003 | A | | 6/1995 | Berteau ...................... 395/200 |
| 5,602,991 | A | | 2/1997 | Berteau ................. 395/200.01 |
| 5,933,490 | A | * | 8/1999 | White et al. ........... 379/221.01 |
| 6,002,759 | A | * | 12/1999 | Kallioniemi et al. ....... 379/220 |
| 6,084,872 | A | * | 7/2000 | Munson et al. ............. 370/351 |
| 6,084,892 | A | * | 7/2000 | Benash et al. .............. 370/701 |
| 6,097,804 | A | * | 8/2000 | Gilbert et al. ............... 379/230 |
| 6,122,364 | A | * | 9/2000 | Petrunka et al. ........ 379/265.11 |

FOREIGN PATENT DOCUMENTS

| CA | 2228189 | 7/1998 | ............. H04Q/3/18 |
| EP | 0 802 690 A1 | 10/1997 | .......... H04Q/29/06 |
| WO | WO 97/38551 | 10/1997 | ........... H04Q/11/04 |
| WO | WO 98/04088 | 1/1998 | |

OTHER PUBLICATIONS

International Search Report of PCT/US99/05758 by European Searching Authority of the PCT dated Jul. 1, 1999.

(List continued on next page.)

Primary Examiner—Ahmad F. Matar
Assistant Examiner—Thjuan P. Knowlin
(74) Attorney, Agent, or Firm—Thomas, Kayden, Horstemeyer & Risley LLP

(57) ABSTRACT

When a subscriber calls into its Internet Service Provider (ISP), a central office receiving the call is triggered to perform a Local Number Portability (LNP) query. This LNP query is sent to an Intelligent Traffic Routing and Control (INTRAC) unit resident on a Service Control Point (SCP) which determines whether the call is to an ISP. If the call is to an ISP, the INTRAC unit polls a Remote Authentication Dial-In User Service (RADIUS) server to determine whether resources are available. The RADIUS server tracks the resources of the ISP and of other ISPs and informs the SCP of the available resources. The SCP then inserts the Local Routing Number (LRN) of the preferred resource into a reply that is sent to the central office. If resources are not available, the call is terminated before signaling occurs with any switch associated with the ISP. On the other hand, when resources are available, the subscriber can be directed to the preferred resource for the subscriber. The subscriber, for instance, can be directed to an access server within the ISP that has excess capacity or can be directed to an access server that provides the best service for the subscriber, whereby subscribers can be directed to X2 type service if they have an X2 modem or to K56Flex type service if they have a K56Flex modem. As another example, if one ISP is at maximum capacity, the subscriber can be directed to a second back-up ISP.

51 Claims, 9 Drawing Sheets

OTHER PUBLICATIONS

Schoen, U. et al., "Convergence Between Public Switching and the Internet," *ISS 97 World Telecommunications Congress*, Global Network Evolution: Convergence or Collision? Toronto, Sep. 21–26, 1997, vol. 1, Sep. 21, 1997 pp. 549–560.

Rigney et al., *RADIUS Accounting*, Network Working Group, Apr., 1997.

Rigney et al., *Remote Authentication Dial–In User Service (RADIUS)*, Network Working Group, Jan., 1997.

Bellcore White paper entitled *Architectural Solutions to Internet Congestion Based on SS7 and Intelligent Network Capabilities*, Dr. Amir Atai and Dr. James Gordon, 1990.

Pat R. Calhoun, *Diameter*, Internet Draft, Mar., 1997.

* cited by examiner

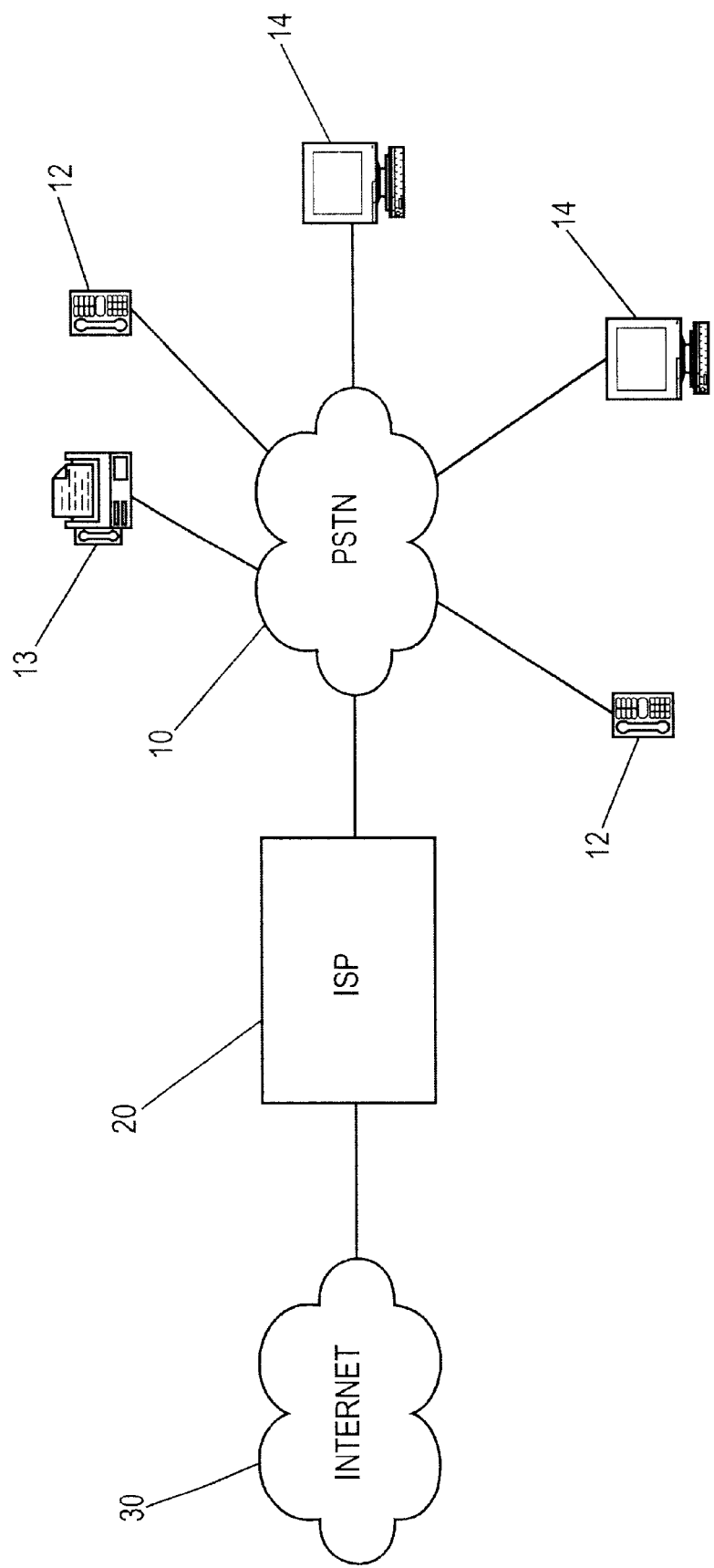

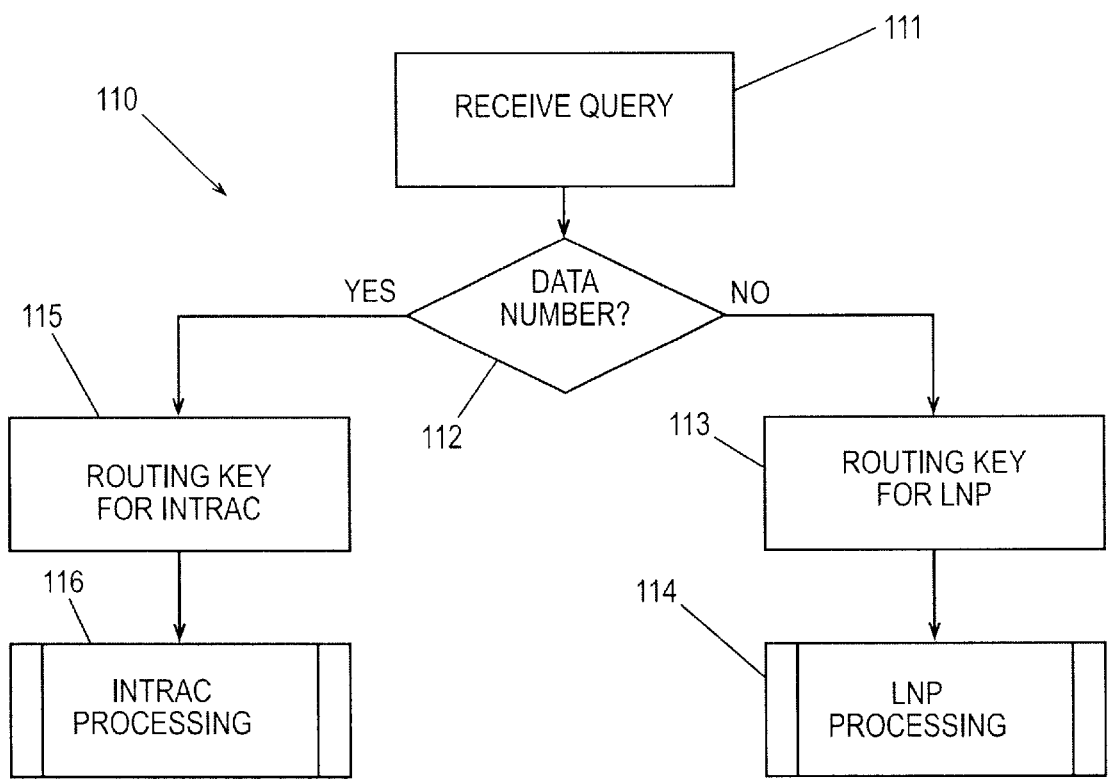

NETWORKS, SYSTEMS AND METHODS FOR ROUTING DATA TRAFFIC WITHIN A TELEPHONE NETWORK BASED ON AVAILABLE RESOURCES

FIELD OF THE INVENTION

The present invention relates generally to networks, systems and methods for routing data traffic within a telephone network and, more particularly, to networks, systems and methods for directing data traffic away from the Public Switched Telephone Network and for routing data traffic based on available resources and information about the state of these resources.

BACKGROUND OF THE INVENTION

The Public Switched Telephone Network (PSTN) is the backbone for providing telephony services to business and individuals in the United States. The PSTN includes a number of switches, generally designated as Service Switching Points (SSPs), for interconnecting a calling party's line to a called party's line. Prior to the 1960's, to complete a call between a calling party and a called party, signaling would occur over the trunk circuits between the switches to ensure that the called party was not busy and to establish a connection between the two parties. This earlier version of the PSTN was rather inflexible in that changes to the PSTN could only occur with the replacement of the hardware in the PSTN. For instance, at this time, the SSPs were hard-wired and had to be replaced with a new SSP in order to update the switch's capability. The switches, however, could not be quickly updated since the standards and specifications had to be well-defined for the various switch vendors. To address the delays in updating switches, these hard-wired SSPs were ultimately replaced with SSPs that had stored program control (SPC). As a result, rather than replacing an entire SSP, the SSP could be modified to enable a new feature simply by updating the software in the SSP. Even with SPC in the SSPs, the PSTN was still limited in the services that it could provide.

A major advancement to the PSTN occurred in the mid-1970's with the introduction of Signaling Transfer Points (STPs) and Signaling System number 7 (SS7) protocol. With the addition of SS7 and STPs to the PSTN, call setup information is routed over a signaling network formed between the STPs and no longer occurred directly over the trunks. For instance, a calling party's SSP would send a data query from one of its associated STPs to an STP associated with the called party. The called party's STP would then determine whether the called party's line was idle and would perform the necessary signaling over the SS7 data network to connect the call. Thus, whereas before call setup signaling would occur over the voice trunks, the STPs and SS7 signaling bypass this traffic away from the voice trunks and onto dedicated data lines. As a result, the capacity of the PSTN to carry voice calls was greatly increased.

In the mid-1980's, demand for additional services from the PSTN resulted in the Intelligent Network (IN). In general, IN provides service logic external to the SSPs and places this logic in databases called Service Control Points (SCPs). To accommodate IN, the SSPs have software to detect service-specific features associated with IN. The software in the SSPs define hooks or "triggers" for the services that require use of an SCP. In response to a trigger, an SSP queries an associated SCP for relevant routing information. For instance, IN permits 800 service and calling card verification service, both of which require a query from the SSPs to the SCP through an STP and the return of routing information to the SSP through an STP. A Service Management System (SMS) was also introduced into the PSTN with IN and provides necessary support in service creation, testing, and provisioning. The SMS communicates with the SCPs and provides software updates to the SCPs.

The demand for increased capabilities has more recently transformed the IN into an Advanced Intelligent Network (AIN). The AIN differs from the IN in that the AIN provides service independent capabilities whereas the IN was limited to service-specific capabilities. AIN provides a high level of customization and builds upon basic services of play announcement, digit collection, call routing, and number translation. Some examples of AIN services include abbreviated dialing beyond a central office, do not disturb service for blocking calls from certain numbers or at certain times, and area number calling service which allows a company to have one advertised telephone number but to have calls routed to a nearest business location.

The ability to provide Local Number Portability (LNP) is perhaps the latest enhancement to the PSTN. The local exchange carriers (LECS) are now required under the Telecommunications Act to provide local number portability so that subscribers can move or "port" their number from one service-provider to another service-provider. Traditionally, the function of a telephone number within the PSTN was both to identify the customer and to provide the PSTN with sufficient information to route a call to that customer. To allow a customer to change its service-provider while at the same time keeping the same telephone number, the telephone number can no longer by itself provide the means to inform the network of the customer's location. A database, called a LNP database, stores routing information for customers who have moved or ported to another local-service provider. The LNP database contains the directory numbers of all ported subscribers and the location routing number of the switch that serves them. With LNP, the SSPs will query an LNP database through a STP in order to correctly route calls to a ported telephone number.

The evolution of the PSTN from providing POTS to AIN services has primarily been driven by the need to support voice telephony. The PSTN, however, is not limited to voice telephony but is increasingly being relied upon for data services. Modems are the predominant means data is transmitted over the PSTN. The integration of voice services with data services is not a new phenomenon and the PSTN has traditionally accommodated these combined services through its Integrated Services Digital Network (ISDN) lines. An ISDN line can carry both voice and data traffic or can be optimized for data-only service at a speed of 128 kbps. Although the ISDN has been available for close to 20 years, the use of the ISDN line is not pervasive and estimates place the number of Internet subscribers employing ISDN service at only 1.4 percent.

Despite the infrequent use of ISDN service, the need for data services is quite extensive. The PSTN has been designed to carry a large amount of voice traffic with each voice call lasting, on average, just a few minutes. While an average voice call is approximately 3.5 minutes, the average Internet call lasts over 26 minutes. Considering that Internet traffic on the PSTN is soon expected to exceed the combined traffic of both voice and facsimile, the capacity of the PSTN will soon be stretched to its limits. The LECs have been meeting this higher demand for capacity by deploying additional switches and other elements within the PSTN. Unfortunately for the LECs, the cost of this additional PSTN equipment is being born almost entirely by the LECs since they will see little increase in their customer base. This added expense to each LEC is approximately $100 million per year and is thus a considerable expense to the LECs.

An immediate need therefore exists to alleviate strains on the PSTN due to Internet traffic. Some solutions to handle Internet congestion have been proposed in the Bellcore White Paper entitled *Architectural Solutions To Internet Congestion Based on SS7 and Intelligent Network Capabilities*, by Dr. Amir Atai and Dr. James Gordon. Many of these solutions discussed in this paper, however, require the design, development, and deployment of new network elements within the PSTN. For instance, several of the solutions introduce an Internet Call Routing (ICR) node which can perform SS7 call setup signaling and which is used to direct Internet calls to a data network. Other solutions rely upon a Remote Data Terminal (RDT) to alleviate congestion while other architectures propose the use of both ICRs and RDTs. The architectures described in the Bellcore White Paper are generally long-term solutions which offer limited assistance to the LECs in the near future. A need therefore still exists for systems and methods for addressing the ever-increasing amount of data traffic in the PSTN.

SUMMARY OF THE INVENTION

The present invention addresses the problems described above by providing networks, systems and methods for directing Internet calls and other data calls away from the Public Switched Telephone Network (PSTN). A call to an Internet Service Provider (ISP) triggers a call to a Service Control Point (SCP). When the query is received at the SCP, the SCP determines whether the called telephone number is a data call. If it is, the SCP routes an inquiry to an Intelligent Traffic Routing and Control Unit (INTRAC) which, according to one aspect of the invention, acquires routing directions and provides them to the SSP. The routing directions are obtained through use of a resource table.

In the preferred embodiment, the SSP is triggered to perform a Local Number Portability (LNP) query to an SCP that performs LNP call processing. The SCP determines whether the call is a data call, and, if it is, directs the call away from an LP call processing unit to the INTRAC unit. Both the LNP call processing unit and the INTRAC unit are Service Package Applications (SPAs) that are resident on the SCP. The SCP has a database of data-related telephone numbers and uses a Routing Key to direct the query to the INTRAC unit. For queries related on to the LNP, the calls are processed in the conventional manner and are not affected by the INTRAC unit.

Instead of, or in addition to, receiving routing directions, the INTRAC unit may also determine whether resources are available for connecting a subscriber's call to its destination. According to this aspect of the invention, the INTRAC unit includes a resource table that may be updated by an external or internal resource tracker. After receiving an LNP query, the INTRAC unit determines from the resource table whether the called party has capacity to process the subscriber's call. If resources are available, the INTRAC returns the routing directions for the preferred provider of the service within the Local Routing Number (LRN) of the LNP response. If service is not available, then the call to the ISP is either redirected to another LRN or is intercepted, in which case the subscriber receives a busy signal or other error treatment. As a result, when resources are not available, the signaling between the subscriber and the ISP provider is eliminated, thereby reducing traffic within the PSTN. On the other hand, when resources are available, the subscriber can be directed to those resources in an efficient manner.

The resource tracker monitors the resources consumed by an ISP or group of ISPs and may be either internal or external to the INTRAC unit. As an example, the resource tracker defines a counter for each access server within an ISP and sets the maximum value of the counter to the available resources of that access server, such as the number of modems. The resource tracker monitors the start and stop messages routed to a Remote Authentication Dial-In User Service (RADIUS) server and accordingly adjusts the value of the counter to reflect the available resources. The resource tracker adjusts values in the resource table to reflect the current capacities of the ISPs. The INTRAC unit can therefore query the resource table in realtime to discover the available resources and, if resources are not available, the call can be quickly re-routed or terminated.

In addition to allowing data calls to be intercepted when resources are not available, data calls can also be more efficiently managed. A subscriber's call, for instance, can be directed to a preferred Point Of Presence (POP) of an ISP or to a preferred access server within an ISP. The routing of the customer's call can be made based on geographic locations or based on a preferred service for the subscriber, such as modem (X2 or K56Flex) or ISDN service. The subscriber's call can also be directed to the most appropriate ISP. For instance, when the subscriber's ISP is at full capacity, the call may be directed to a secondary ISP that offers backup service to a preferred ISP.

One manner of controlling the destination of data calls is through the use of Local Routing Numbers (LRNs). When an LNP query is sent from an SSP to the LNP SCP, the INTRAC unit associated with the LNP SCP provides the LRN returned in the response to the SSP. This LRN may be obtained by the INTRAC unit from the resource table or by an external resource tracker. The external resource tracker or the INTRAC unit derives a preferred LRN based on the called party, and possibly also based on the calling party. For instance, the information in the resource table can be used to direct a subscriber's call to a preferred access server within an ISP or even to an access server in a backup ISP.

Accordingly, it is an object of the present invention to provide networks, systems, and methods for reducing traffic in the PSTN.

It is another object of the present invention to provide networks, systems, and methods for efficiently routing data calls.

It is a further object of the present invention to provide networks systems, and methods for routing calls to a preferred resource within the ISP.

It is yet another object of the present invention to provide networks, systems, and methods for redirecting calls to a secondary resource when a first ISP is at peak capacity.

Other objects, features, and advantages of the present invention will become apparent with respect to the remainder of this document.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings:

FIG. 3 is a diagram of a network according to a preferred embodiment of the invention;

FIG. 9 is a flow chart of a method of processing queries at the SCP of FIG. 8; and FIG. 10 is an example of a resource table according to a preferred embodiment of the invention.

DETAILED DESCRIPTION

Reference will now be made in detail to preferred embodiments of the invention, nonlimiting examples of which are illustrated in the accompanying drawings.

I. Conventional Network

Figure 1:
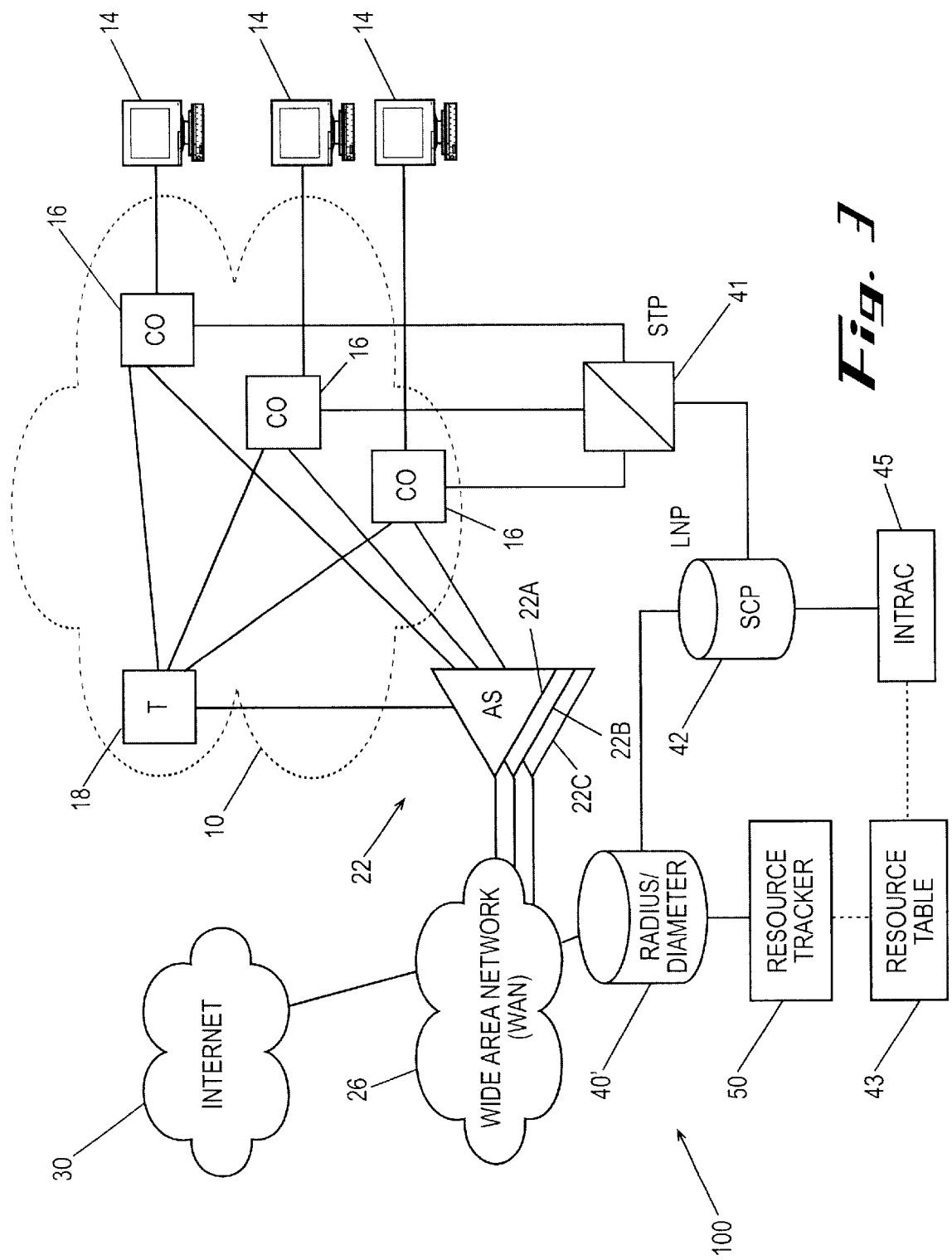
FIG. 1 is a diagram of a conventional network for providing data service to a subscriber.

With reference to FIG. 1, the Public Switched Telephone Network (PSTN) 10 provides local and long distance telephony service to its subscribers, such as those represented by telephones 12, facsimile machines 13, and computers 14. As discussed above, the PSTN 10 includes Service Switching Points (SSPs), Signaling Transfer Points (STPs), Service Control Points (SCPs), and Service Circuit Nodes (SCNs), which are collectively represented by the PSTN 10. The PSTN 10 also provides a connection to the Internet 30, such as through an Internet Service Provider (ISP) 20. A subscriber using a computer 14 must direct a call through the PSTN 10 in order to gain access to his or her ISP 20, which in turn provides access to the data network called the Internet 30. This arrangement of going through the PSTN 10 presents a number of problems and challenges, some of which have already been described.

Figure 2:
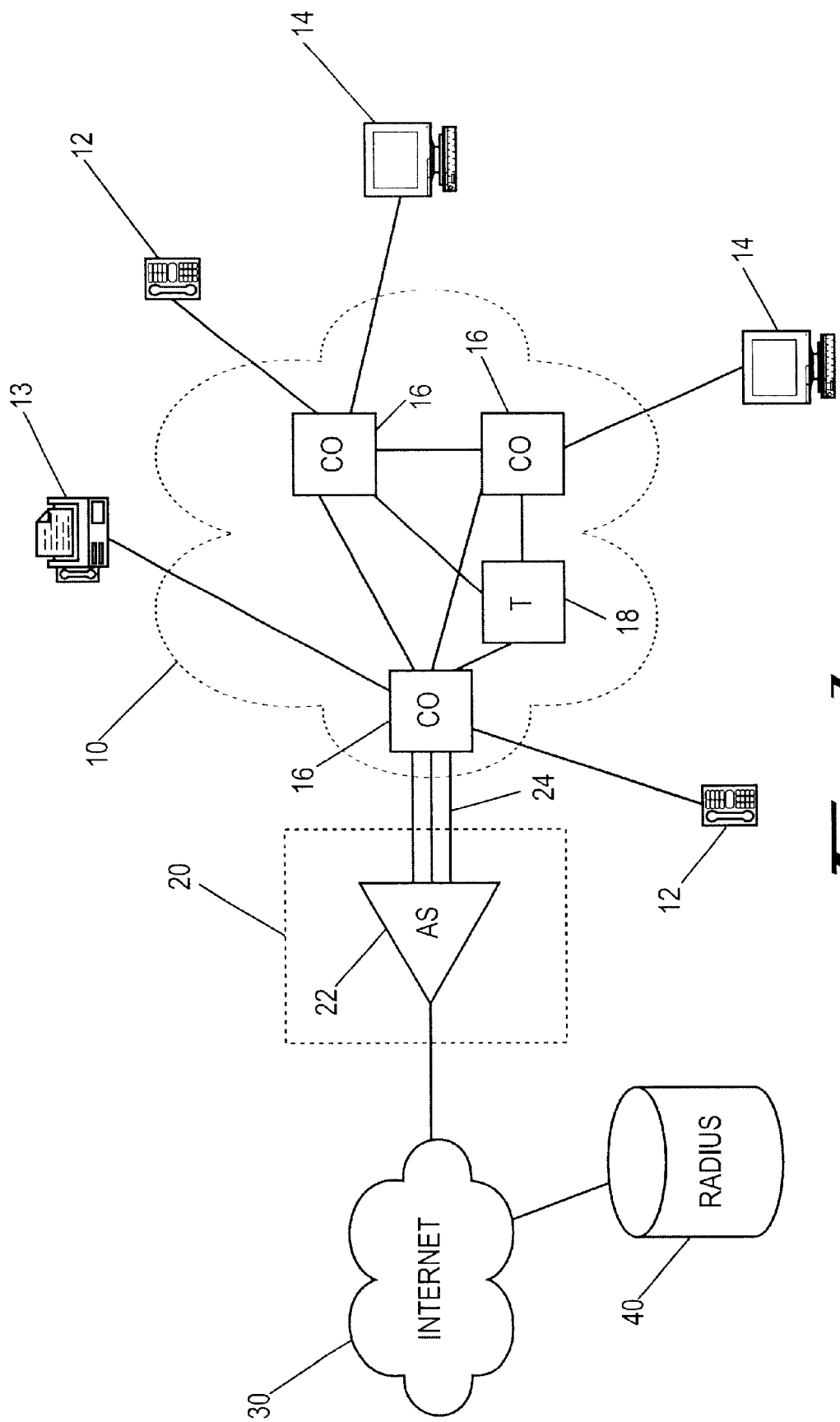
FIG. 2 is a more detailed diagram of an Internet Service Provider and RADIUS server for the network shown in FIG. 1.

The PSTN 10, as shown in more detail in FIG. 2, includes a number of central offices (COs) 16 and tandem switches (T) 18. Typically, a plurality of subscribers are connected to a single central office 16 and the central offices 16 are inter-connected to each other through one or more tandem switches, such as the tandem switch 18. The ISP 20 has an Access Server (AS) 22 connected to the PSTN 10 through a number lines, which are often primary rate ISDN (PRI) lines 24. The PRI lines 24 extend between the ISP 20 and a single central office 16 within the PSTN 10 and the ISP 20 is connected to the Internet 30.

The access server 22 in the ISP 20 includes a modem pool for linking its customers to the Internet 30. The ISP 20 has a need for a significant amount of administrative support in order to track and manage each subscriber's access to the Internet 30. A Remote Authentication Dial-In User Service (RADIUS) server 40 provides this administrative support to the ISP 20. The RADIUS server 40, in general, provides authentication, authorization, and accounting services for the ISP 20. A RADIUS server may also provide routing and tunneling support in some implementations, which will become more apparent from the description below. When the ISP 20 begins a session for a subscriber, the ISP 20 sends an authentication request message to the RADIUS server 40 describing the subscriber for which the service is being provided. This message typically also includes the subscriber's name and the subscriber's password. Upon receipt of the authentication request message, the RADIUS server 40 sends an acknowledgment that the message has been received with authentication results. The RADIUS server 40 verifies the subscriber's name passed from the access server 22 and the password and also returns configuration information to the access server 22 for that particular subscriber. If authentication is successful, a start accounting message is sent to the RADIUS server 40. At the end of a session with a subscriber, the access server 22 sends a stop message indicating the type of service that was delivered and possibly other information, such as elapsed time. The services that may be provided to the subscriber include SLIP, PPP, Telnet, or rlogin. Additional information on the RADIUS server 40 may be found in Rigney et al., *Remote Authentication Dial-In User Service* (RADIUS), Network Working Group, January, 1997, or in Rigney et al., *RADIUS Accounting*, Network Working Group, April, 1997.

One challenge facing the ISP 20 is striking a balance between efficient utilization of its resources and providing capacity to meet subscriber demand. The resources of the ISP 20 is predominantly its pool of modems and the ISP 20 tries to minimize this cost by ensuring that all of its modems operate at peak capacity. To provide a quality service to its subscribers, on the other hand, the ISP 20 should ideally be able to provide access to the Internet 30 for each subscriber whenever he or she wants and should strive to provide each customer with maximum bandwidth. The ISP 20 typically strikes this balance by attempting to closely shape its capacity to customer demand and by reducing transfer speeds when demand for services increases. Due to the difficulty in estimating customer demand and due to fluctuations in the demand and in the subscriber base, the ISP 20 is often operating at peak capacity and is unable to accommodate any more calls from its subscribers.

This difficulty in reaching the ISP 20 can be problematic for both the ISP 20 as well as for the Local Exchange Carrier (LEC). For the ISP 20, the subscriber is likely frustrated that he or she cannot reach the ISP 20 and may decide to discontinue service with the ISP 20 and sign up with another ISP that can offer better quality service. Even when the subscriber is able to connect with its ISP 20, the subscriber is often frustrated by the limited amount of available bandwidth and to the resultant slow transfer speeds. For the LEC, a subscriber who cannot initially make contact with its ISP 20 often repeatedly attempts to make contact with the ISP 20 and may continue to do so until communications are established. Each time that the subscriber attempts to contact his or her ISP 20, the subscriber consumes valuable resources of the PSTN 10 since each call requires a considerable amount of processing and signaling within the PSTN 10, including signaling between an SSP and STP associated with the subscriber and between an SSP and STP associated with the ISP 20. Additional resources of the PSTN 10 may also be consumed if queries are sent to an SCP, such as when the subscriber dials a 1-800 number to reach the ISP 20. A need therefore exists for a way of more efficiently controlling and managing the resources of an ISP and of the PSTN.

II. Network Overview

A network 100 for more efficiently controlling and managing resources of an ISP and of the PSTN is shown in FIG. 3. The network 100 includes subscribers having computers 14 who are provided Internet access through one or more ISPs. Each computer 14 is connected to one of the central offices 16 within the PSTN. As shown in FIG. 2, a number of subscribers with computers 14 are connected to one of the central offices 16 within the PSTN 10. The central offices 16 and the tandem switch 18 are connected to one or more access servers 22, preferably through Primary Rate ISDN lines (PRI). The central offices 16 are also connected to an SCP 42 which provides Local Number Portability (LNP) services to the PSTN 10. The network 100 additionally includes an Intelligent Traffic Routing and Control (INTRAC) unit 45 connected to the SCP 42 and a resource tracker 50 connected to the RADIUS server 40. Although the INTRAC unit 45 is illustrated as a separate item from the SCP 42, as described in more detail below, the INTRAC unit 45 preferably resides on the SCP 42 as a Service Package Application (SPA).

As described above, one application of a RADIUS server provides authentication, authorization, and accounting services to the ISP 20. This first application of a RADIUS server is typically associated with a single ISP 20 and is a Level 2 Tunneling Protocol (L2TP) Network Server, commonly referred to as an LNS. A second application of a RADIUS server, such as RADIUS server 40' shown in FIG. 3, generally provides routing and tunneling support for an LEC. This application of RADIUS server 40' is an L2TP Access Concentrator, commonly referred to as a LAC. After receiving a call from a subscriber, an Access Server 22 queries the RADIUS server 40' for level 2 tunneling information. In response to one of these queries, the RADIUS server 40' determines how to route the call through the LEC's Wide Area Network (WAN) 26 so that the call reaches the proper destination with the Internet 30. The WAN 26 may comprise any suitable type of network, such as a frame relay or Asynchronous Transfer Mode (ATM). Upon reaching an ISP within the Internet, such as AOL, the ISP has its LNS RADIUS server 40 for providing the authentication, authorization, and accounting services.

The network 100 is not limited to the RADIUS server 40' but may encompass other types of servers and is preferably a DIAMETER server 40'. The DIAMETER protocol is an enhancement to the RADIUS protocol and is backward compatible with the RADIUS protocol. The RADIUS protocol has a limited command and attribute address space and is not in itself an extensible protocol. The RADIUS protocol, furthermore, assumes that there are no unsolicited messages from a server to a client. The DIAMETER protocol, on the other hand, supports new services and permits a server to send unsolicited messages to clients on a network. As a result, the RADIUS server 40', if implemented as a DIAMETER server 40', supports messages from it to any of the Access Servers 22. This allows the acquisition of additional state information applicable to the resource tracker. Various proprietary "DIAMETER"-like client/server approaches may also be used with the invention.

While FIG. 3 depicts access servers 22, the ISP is not delineated in the figure for reasons that will become apparent from the following description. As explained in more detail below, the access servers 22A to 22C may be operated by a single ISP or by multiple ISPs. Furthermore, the ISPs may not operate the access servers 22 but instead may have a data connection to the PSTN 10, with the circuit to packet adaptation being performed through the access servers 22 by a different entity, such as by a Local Exchange Company (LEC). Thus, the data calls intended for an ISP may be packetised prior to being delivered to the ISP. A first ISP, for instance, may be connected to the output of access server 22A, a second ISP may be connected to the output of access server 22B, and a third ISP may be connected to the output of access server 22C. A single ISP, of course, may be connected to more than one access server 22, whereby a single ISP may be connected to the outputs of all access servers 22A to 22C.

The network 100 also includes a resource table 43. As will be explained in more detail below, the resource table 43 may be connected to the INTRAC unit 45 or may instead be connected to the resource tracker 50. Furthermore, although the resource table 43 has been shown as a separate element, the resource table 43 may be incorporated in and form a part of the INTRAC unit 45 or the resource tracker 50. The connections between the resource table 43 and both the INTRAC unit 45 and resource tracker 50 have therefore been shown in dashed lines since the resource table 43 is not limited to its illustrated location.

III. INTRAC

Figure 4:
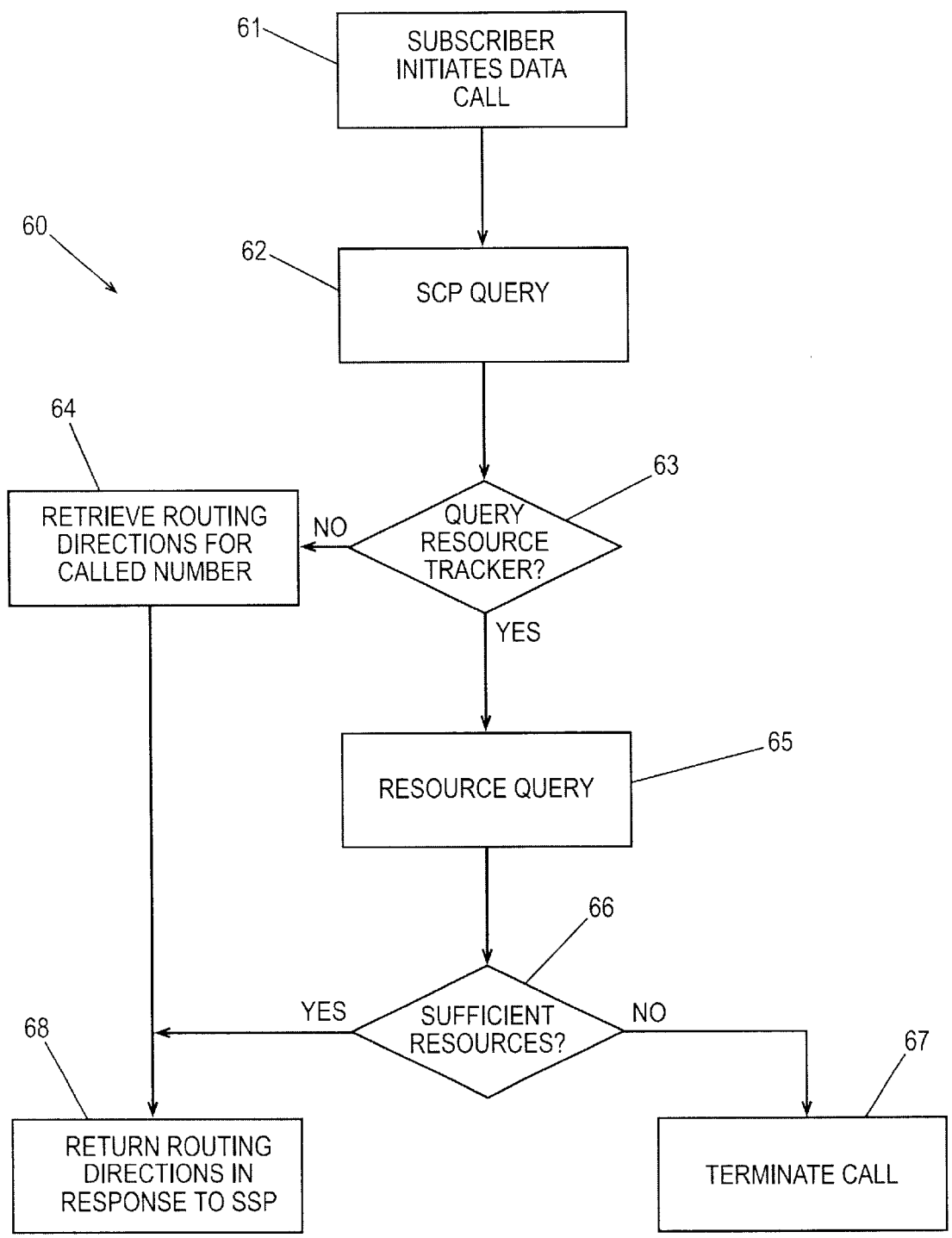
FIG. 4 is a flow chart depicting a process of handling a subscriber's data call.

An operation according to one embodiment of the invention of the network 100 will now be described with reference to FIG. 4. At a step 61, a subscriber initiates a call to its ISP through computer 14 and initiates a call to its ISP through one of the central offices 16. At step 62, the central office 16 receives the called number from the subscriber and is triggered to send a query to an SCP. This query is passed through an STP 41 to the SCP 42.

At step 63, the SCP 42 receives the query from the central office 16 through the STP 41 and determines whether the resource tracker 50 should be queried. According to one aspect of the invention, the INTRAC unit 45 does not query the resource tracker 50 but instead processing continues at step 64 with the INTRAC unit 45 retrieving routing directions for the ISP directly from the resource table 43. These routing directions are returned in a response to the central office 16 at step 68.

The INTRAC unit 45, based on the reply from the resource table 43, determines whether sufficient resources are available at step 66 and formulates an appropriate response to the SCP 42. This appropriate response contains routing directions for directing the call to a preferred location within the PSTN. If the response from the resource table 43 indicates that sufficient resources are available, then the INTRAC unit 45 at step 68 returns a response to the central office 16 which contains the routing directions. On the other hand, if resources are not available, then the INTRAC unit 45 at step 67 will return a response to the central office 16 terminating the call, such as by providing a busy signal to the caller.

In the preferred embodiment, the central office 16 performs an LNP trigger and sends an LNP query to the SCP 42. The routing directions returned in the response from the INTRAC unit 45 at step 68 preferably contains the Local Routing Number (LRN) for where the subscriber's call should be routed. Through use of the LNP trigger, LNP query, and LRNs, calls to an ISP and other data-related calls can be directed away from the PSTN 10 and onto dedicated trunks for data calls. As shown in FIG. 3, for instance, each SSP or central office 16 is directly connected to an access server 22 and the LRN directs the subscriber's call to a trunk group interconnecting the central office 16 to the access servers 22.

The signaling between the SCP 42 and the STP 41 and central offices 16 is not altered with the invention. The signaling to and from the SCP 42 conforms to Signaling System 7 (SS7) and appears as a typical LNP inquiry and response.

At step 64, the INTRAC unit 45 retrieves the routing directions in any suitable manner. The INTRAC unit 45 preferably uses the resource table 43 which holds the LRNs for each ISP. When the INTRAC unit 45 receives a query from an SSP 16, the INTRAC unit 45 performs a look-up function in the resource table 43 to find the appropriate LRN for the called telephone number and returns the LRN in a response to the LNP query at step 68.

IV. Resource Tracker

According to another aspect of the invention which involves the resource tracker 50, the INTRAC unit 45 formulates a resource query at step 65. The resource query, as will be described in more detail below, is a query sent from the INTRAC unit 45 to the resource tracker 50 to inquire as to the resources available for the subscribers call. The resource tracker 50 receives the resource query and, in response, checks the available resources of the ISP. Based on its evaluation of ISP resources through its connection to the RADIUS server 40', the resource tracker 50 returns an appropriate response to the INTRAC unit 45 with information about the available resources at step 66. According to this embodiment, the resource table 43 is managed by the resource tracker 50. In response to receiving the resource query, the resource tracker 50 consults with the resource table 43 to find a preferred LRN for the subscriber's call.

The signaling between the access servers 22 and the RADIUS server 40' is not changed with the invention. The access servers 22 communicate with the RADIUS server 40' according to the RADIUS accounting protocol, or other suitable protocols. The resource tracker 50 preferably communicates with the INTRAC unit 45 according to GR 1129-CORE, a signaling protocol defined in AIN 0.2, although other protocols may be used, such as 1129+, 1129A, TCP/IP, or another protocol.

V. Call Routing

Regardless of how the INTRAC unit 45 obtains the LRN, the LRN is provided to the switch to direct the call to a preferred location or trunk group. The LRN, for instance, may redirect the subscriber's call to a different location or, alternatively, simply contains the same telephone number called by the subscriber. The INTRAC unit 45 therefore may rely upon the resource tracker 50 to redirect calls, to determine whether resources are available to connect the subscribers call, or to determine whether the subscriber's call should be terminated.

One advantage of the network 100 over the conventional network shown in FIG. 2 is that ISPs no longer need to have a concentrated Point of Presence (POP). Typically, as shown in FIG. 2, an ISP 20 is connected to the PSTN 10 through a single egress switch such as central office 16, through PRIs 24. This concentrated POP for the ISP 20 renders it difficult and expensive to relocate the ISP 20 to another location, both for the ISP 20 and for the LEC. For the LEC, moving an ISP from one location to another location is tremendously expensive since the LEC must build the infrastructure necessary to support the ISP at the new location and the investment at the old location must be dismantled at a great loss to the LEC.

The network 100 shown in FIG. 3, in contrast, does not require the ISP to have a concentrated POP. Rather than directing all calls to an ISP through a single central office 16, each SSP 16 in network 100 preferably has a direct connection to the ISP through one of the access servers 22. The LRN returned to the SSP therefore directs the SSP to a specified trunk or trunk group in order to route the data call to the access servers 22. The connections between the SSPs and the access servers are preferably PRI lines. By directing calls from each ingress switch to the access servers 22 and away from the PSTN, costs associated with handling data calls are substantially reduced. For the ISP, the use of LRNs to route calls from their subscribers offers flexibility in how the ISPs network are built and distributed, both from a viewpoint of timing and geography.

VI. Resource Query

Figure 5:
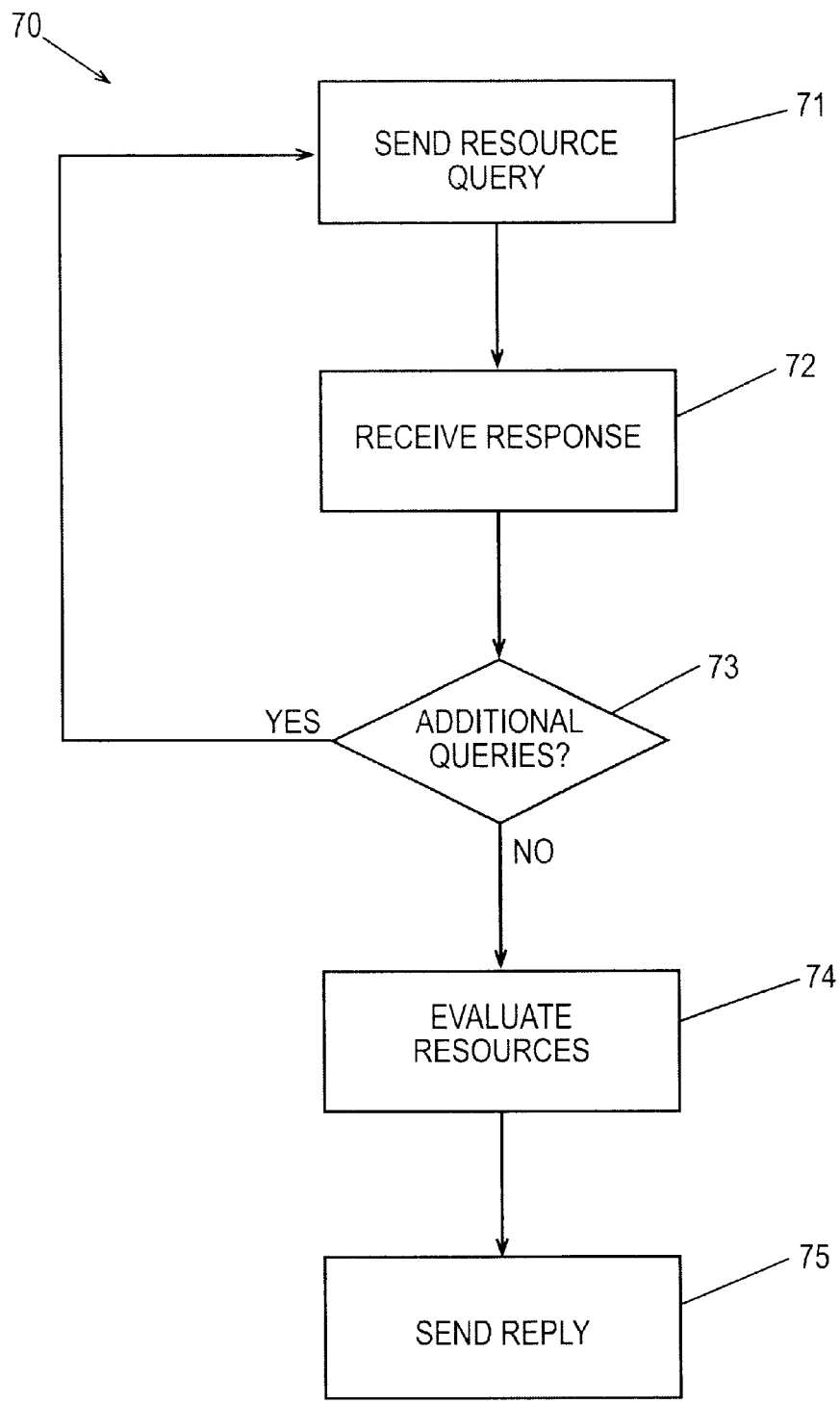
FIG. 5 is a flow chart depicting a process of generating an ISP resource inquiry.

A process 70 for generating the resource query at step 65 of FIG. 4 will now be described with reference to FIG. 5. The process 70 explains in more detail steps that occur after a determination has already been made by the INTRAC unit 45 that a query should be sent to the resource tracker 50. At a step 71, after the INTRAC unit 45 receives the query from the SSP, the INTRAC unit 45 sends a resource query to the resource tracker 50. The resource query includes the called telephone number, thereby designating the ISP, and may also include the calling party's telephone number, thereby designating the subscriber. At step 72, the INTRAC unit 45 receives a response from the resource tracker 50 and determines, at step 73, whether to generate any additional resource queries. These additional resource queries, as discussed in more detail below, may query the resource tracker 50 as to the available resources of other access servers or other ISPs. The additional resource queries, moreover, may query the resource tracker 50 as to preferred resources that are available for a particular subscriber. If additional queries are made, then processing returns to step 71 where the resource query is formulated and to step 72 where the response is received from the resource tracker 50.

When no more resource queries are needed, the INTRAC unit 45 at step 74 evaluates the resources available to the subscriber. This evaluation focuses, according to established criteria, on the most desired access server, the most desired ISP, or other factors that are influential in directing the subscriber's call. At step 75, the INTRAC unit 45 issues an appropriate reply to the central office 16. If resources are available for the subscriber, then the reply sent to the central office 16 includes the LRN for routing the subscriber's call.

The evaluation of resources may alternatively be performed by the resource tracker 50 instead of by the INTRAC unit 45. The INTRAC unit 45 sends the resource query to the resource tracker 50 with this query containing the called telephone number and possibly also the calling party's telephone number. The resource tracker 50 selects the desired LRN for the subscriber's call based on decision-tree routing stored within the resource tracker 50. This decision-time routing can be customized for an ISP, an LEC, or other entity. The resource tracker 50 checks the telephone number called by the subscriber and return a response indicating whether resources are available at that number. The resource tracker 50 may perform additional processing and find an optimal LRN for the subscriber based on the called telephone number and possibly also based on the calling party's telephone number. An advantage of having the evaluation of resources performed at the resource tracker 50 is that the resource queries and the responses to these queries can be eliminated.

VII. Tracking Resources

Figure 6:
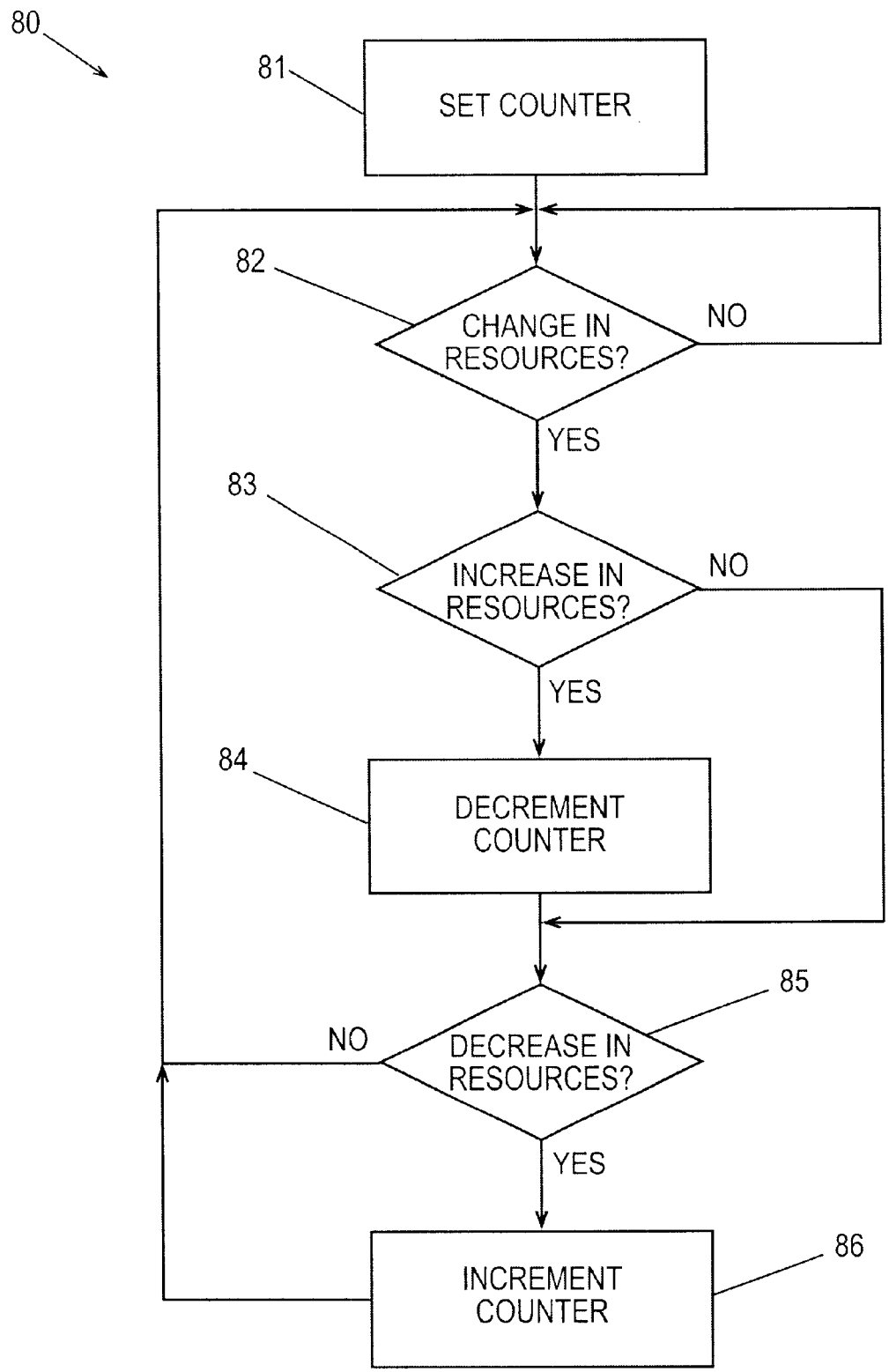
FIG. 6 is a flow chart depicting a method of monitoring consumption of resources.
Figure 7:
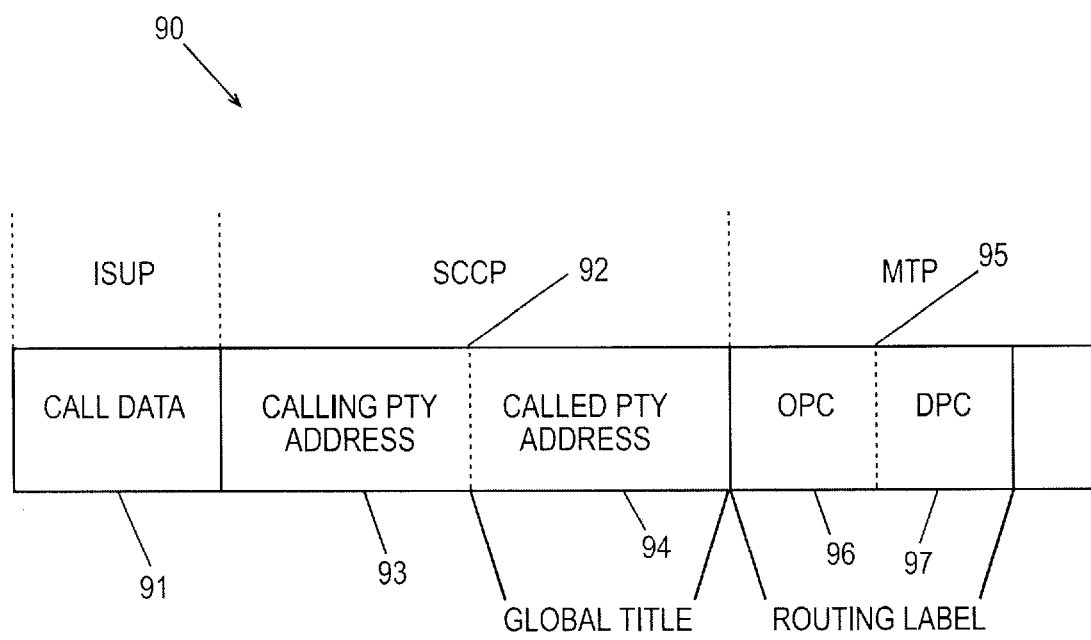
FIG. 7 is a diagram of a Common Channel Signaling System 7 (CCS7) message format.

A method 80 for tracking the resources of an access server or ISP at the resource tracker 50 will now be described with reference to FIG. 6. At a step 81, the resource tracker 50 sets the maximum value of a counter to the peak capacity of the access server or ISP, or other desired maximum. As an example, if the ISP has 100 modems available, the resource tracker 50 sets the counter to a value of 100. At step 82, the resource tracker 50 determines whether a change in a session has occurred. The RADIUS server 40', as discussed above, receives start and stop messages from the access servers and ISPs when sessions begin and when they terminate, respectively. The resource tracker 50 monitors these start and stop messages and determines that a change in a session occurs when either of these messages is received. At step 83, the resource tracker 50 determines whether a session has started and, if so, decrements the counter at step 84. At step 85, the resource tracker 50 determines whether a session has stopped and, if so, increments the counter at step 86. The process 80 returns to step 82 to detect the next change in a session. The available resources of each ISP are stored in the resource table 43. This functionality remains the same whether the ISP's resources are provided by a single Access Server or multiple Access Servers dispersed across a wide geographical area.

In general, through the method 80 and counters, the resource tracker 50 tracks the number of available resources and reduces the value in the counter for each new session that has started. Conversely, when a session terminates, the resource tracker 50 increments the counter to reflect new resources that have become available to the network 100. According to one aspect of the invention, the resource tracker 50 has a counter for each ISP that it is monitoring and each counter reflects the total number of resources available for that ISP. According to a further aspect of the invention, the resource tracker 50 has a plurality of counters for each ISP with each counter reflecting the available resources within part of the ISP. Each counter, for instance, may be dedicated to a single Point Of Presence (POP) managed by the ISP with a single ISP having plural POPs. As another example, each counter may be dedicated to a single access server within an ISP. One access server, for instance, may provide K56 service and a second access server may provide K56Flex service to its subscribers while yet another may after more recently developed modem techniques, such as V.90. Other uses and examples of the counters for tracking and monitoring resources of an ISP will become apparent to those skilled in the art.

The resources of the ISP can alternatively be monitored through the SCP 42 and INTRAC unit 45. Through monitoring of call set-up signaling and termination notification signaling to the ISP, the INTRAC unit 45 determines the resources available at the ISP. The INTRAC unit 45, based on this determination, then updates the resource table 43 to reflect the available resources.

VIII. Data Signaling

A preferred method of directing a subscriber's call to the INTRAC unit 45 will now be described. When the subscriber's call is received at the SSP 16, the SSP 16 determines that the call is to a local number and is triggered to perform an LNP query. In general, queries passed from an SSP to an SCP and responses from the SCP to the SSP pass through a Common Channel Signaling System (CCS7) network that includes the STPs. A CCS7 message is comprised of three parts: an MTP part that contains the Routing Label, an SCCP part that contains the Global Title (GT), and a data field. The data for a call setup is defined as ISDN User Part (ISUP) data and data for database services is defined as Transaction Capability Application Part (TCAP) data.

An explanation will first be given for the signaling that occurs when a subscriber calls a ported telephone number which requires LNP call processing. The SSP 16 receiving the call inserts its point code in Originating Point Code (OPC) 96 and inserts the capability of a local STP 41 pair in the Destination Point Code (DPC) 97, with the OPC 96 and DPC 97 together forming the Routing Label for the query 90. The Called Party Address 94 of the query 90 includes a Global Title (GT) which the SSP 16 populates with the ten-digit dialed telephone number and also includes a Sub-System Number (SSN) which the SSP 16 populates with all zeros. In a Calling Party Address 93 part of the SCCP 92, the SSP 16 inserts the point code for the SSP 16 and the AIN 0.1 Sub-System Number for the SSP 16. The TCAP 91 part of the query 90 includes a Transaction ID (TID) identifying the call, a Trigger Type (TT) identifying the type of trigger detected by the SSP 16, and a Service Key (SK) equal to the ten-digit dialed number. The STP 41 receives this query 90 and performs a Global Title Translation (GTT) and changes the Routing Label 95 before sending the query 90 to the SCP 42 that performs LNP call processing.

An explanation of call signaling according to a preferred embodiment of the invention will now be provided. When a subscriber call its ISP or otherwise makes a data call, the SSP 16 receiving the call performs an LNP query 90 when the call is to a local number. The LNP query 90, according to standard LNP call processing, is passed to the STP 41 for Global Title Translation and the STP 41 launches a reformatted query 90 to the SCP 42 for processing.

Figure 8:
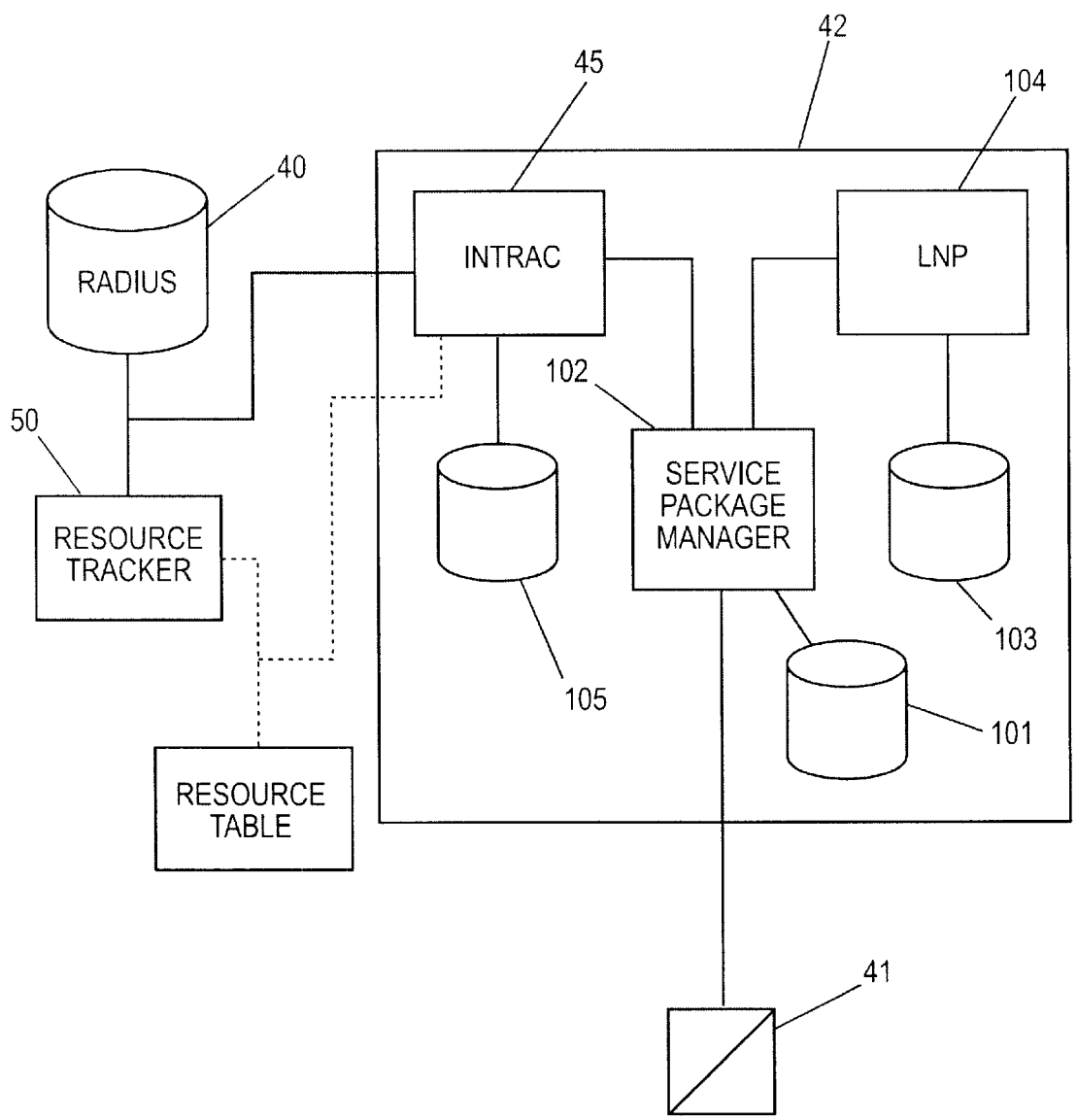
FIG. 8 is a more detailed diagram of an Service Control Point according to a preferred embodiment of the invention.

In contrast to a conventional LNP query 90, though, the LNP query 90 according to the invention is rerouted when the call is a data call. A diagram of the SCP 42 and a method 100 according to a preferred embodiment of processing the query 90 at the SCP 42 will now be described with reference to FIGS. 8 and 9, respectively. The SCP 42 includes a Service Package Manager 102 for receiving queries from the STP 41 through the CCS7 network, a database 103, the INTRAC unit 45, and an LNP processing unit 104. In the preferred embodiment, the INTRAC unit 45 and the LNP processing unit 104 are each a Service Package Application (SPA) within the SCP 42 and share the same SSN and translations type. At a step 111, the Service Package Manager 102 within the SCP 42 receives the query 90 from the STP 41 through the CCSS7 network. The Service Package Manager 102 at step 112 compares the dialed telephone number in the Called Party Address 903 field of the query 90 to numbers stored in the database 103 to determine whether the call is a data call, such as to an ISP. The telephone numbers identifying data calls are preferably collected at a central location and downloaded to the various SCPs 42 through a Service Management System.

If the dialed telephone number does not identify the call as a data call by the primary Routing Key, then at step 113 the Service Package Manager 102 generates a default Routing Key and passes the call for LNP call processing. A Routing Key is comprised of an SSN, a Trigger Type, and a Service Key. The SSN in the Routing Key typically is populated by an SCP with the SSN in the SCCP Called Party Address, and the Trigger Type and Service Key are both acquired from the TCAP part of the query 90. At step 113, the Routing Key is generated in the conventional manner and at step 114 standard LNP call processing is performed by the LNP processing unit 104. The LNP processing unit 104 performs a look-up function in a database 105 and inserts the LRN of an SSP 16 serving the called party in the Called Party Address 94 and inserts the actual called-party telephone number is placed in a Generic Address Parameter (GAP) field. For an LNP query that does not involve a data call, the LNP call processing is not effected by the INTRAC unit 45 and signaling within the PSTN occurs in the standard way.

In contrast, when the Service Package Manager 102 finds a match between the dialed telephone number and an entry in the database 103 at step 112, then the Service Package Manager 102 generates a Routing Key at step 115 specific for the INTRAC unit 45. This Routing Key contains the same Trigger Type and Service Key as those in the Routing Key generated at step 113 for a call that should be routed to the LNP processing unit 104. The SSN populated by the Service Package Manager 102 at step 115 is a SSN unique to the INTRAC unit 45. Based on the Routing Key, the SCP 42 passes the query 90 to the INTRAC unit 45 at step 116 for further processing. The INTRAC unit 45, as with the LNP processing unit 104, inserts a preferred LRN in the Called Party Address 94, with this LRN being obtained directly from the resource table 43, either through a look-up function or through the resource tracker 50. Although the resource table 43 has been shown separately from the SCP 42, it should be understood from the description above that the resource table 43 would preferably be a real-time database on the SCP 42. The resource table 43, for instance, may form a part of the database 105.

IX. Resource Table

A preferred example of the resource table 43 is shown in FIG. 10. The resource table 43 includes a customer identification number uniquely identifying a particular ISP. Although only two customer IDs have been shown in FIG. 10, the resource table 43 typically contains a greater number of customer IDs. For each customer ID, the resource table 43 includes a number of telephone numbers assigned to that ISP with these telephone numbers being represented by telephone numbers 1, 2, . . . N. The resource table 43 further includes an entry for the volume of calls permitted to that ISP, such as 50 calls, and the present number of active calls. The resource table 43 may also include an entry enabling the routing of overflow calls and also one or more entries designating the LRNs for overflow calls.

With resource table 43, the resource tracker 50 or INTRAC unit 45 can easily derive appropriate routing directions for a subscriber's call. By checking the peak volume of the ISP and the number of active calls, the resource tracker 50 or INTRAC unit 45 can determine whether calls can be routed to that ISP. If the ISP is at peak capacity, then the resource tracker 50 or INTRAC unit 45 checks whether overflow capacity is enabled and, if so, where the call should be routed. The customer identification and overflow routing can be contained within a single ISP or may encompass a multitude of ISPs. A single ISP, for instance, may have a plurality of "customer" identification numbers with each customer ID relating to a separate class of service. In this manner, the resource tracker 50 or INTRAC unit 45 performs processing based on the desired class of service for a subscriber. The overflow according to this arrangement directs calls to a less desired type of service within the ISP or to other ISPs offering that service. The customer IDs may instead be dedicated to different POPs of an ISP with subscribers preferably being directed to the closest POP and with overflow calls being directed to other POPs of the ISP. Instead of directing calls to another POP or type of service within a single ISP, the overflow may direct calls to a secondary or back-up ISP. As will be appreciated by those skilled in the art, the resource table 43 can be configured in various other ways and should not be limited to the example shown in FIG. 10.

X. Network Configurations

Based on the descriptions above, the network 100 can be configured in a multitude of ways, depending upon the specific application. According to one aspect of the invention, the network 100 does not include the resource tracker 50 and the INTRAC unit 45 does not perform any resource query. Instead, the INTRAC unit 45 receives queries from the subscriber's SSP, derives a desired LRN from the resource table 43, and inserts the desired LRN in a response returned to the SSP. The INTRAC unit 45 may simply look up the LRN in the resource table 43 or may perform some processing of information in the resource table 43 before arriving at the desired LRN.

According to another embodiment of the invention, the INTRAC unit 45 and SCP 42 may monitor the resources of the ISPs. As discussed above, the INTRAC unit 45 tracks the resources available in an ISP by monitoring call set-up signaling and termination notification signaling. The INTRAC unit 45 can therefore direct the subscriber's call to a preferred LRN and can also terminate the call if resources are not available.

According to another aspect of the invention, the network 100 includes both the INTRAC unit 45 and the resource tracker 50. The resource tracker 50 determines whether the call initiated by the subscriber through computer 14 should be routed to the ISP or should be intercepted based on the available resources. The resource tracker 50 determines whether the ISP has resources available for the subscriber and generates an appropriate reply to the INTRAC unit 45 at step 66. If resources are available, the call is completed in its usual manner through the PSTN 10 to the access server 22. If, on the other hand, resources are not available at the ISP, then the subscriber's call is intercepted before further signaling occurs within the PSTN 10 and the subscriber receives a busy signal at step 67. The network 100 according to this aspect of the invention connects the subscriber to the ISP or intercepts the call and is able to reduce signaling within the PSTN.

According to a further aspect of the invention, the network 100 includes both the resource tracker 50 and INTRAC unit 45 and the resource tracker 50 returns a LRN to the INTRAC unit 45. As discussed above, the LRN returned by the resource tracker 50 is chosen from the resource table 43 based on any suitable criteria. In one example, the resource tracker 50 selects the LRN based on a preferred access server 22. With reference to FIG. 3, the access server 22 comprises a plurality of access servers 22A, 22B, and 22C. When a subscriber calls in to any one of these access servers 22A, 22B, or 22C, an LNP query is initiated at the central office 16 and a resource query is generated by the INTRAC unit 45. The resource tracker 50, according to this example, tracks the resources available for each of the access servers 22A, 22B, and 22C through one or more counters. The resource tracker 50 includes the LRN in its response to the INTRAC unit 45 so that the subscriber is directed to an access server 22 that has excess capacity. For instance, if the access server 22 called by the subscriber is at peak capacity or is presently consuming more than a certain threshold of capacity, the resource tracker 50 and INTRAC unit 45 direct the subscriber's call to the access server 22 having excess capacity. As an example, an initial call from computer 14 to access server 22A is redirected to access server 22C when access server 22A is at peak capacity and access server 22C has excess capacity. After the access server 22 with excess capacity has been located, the INTRAC unit 45 inserts the LRN to direct the subscribers call to this access server 22 and returns the response to the central office 16 through the STP 41. To the central office 16 and the PSTN 10, the telephone number called by the subscriber appears to have been a ported number and the PSTN 10 provides the appropriate LRN for the subscriber's call.

The criteria used in selecting the preferred LRN is not limited to a particular access server within a single ISP, but rather may be used to allocate resources between two or more ISPs. For instance, when resources for a first ISP are at peak capacity or above a certain threshold level of capacity, the INTRAC unit 45 redirects calls away from that first ISP to a second ISP having excess capacity. The resource queries sent from the INTRAC unit 45 are therefore concerned not only about the capacity within the first ISP but can also look to the resources of other ISPs. Thus, for instance, if MindSpring is at peak capacity, the INTRAC unit 45 and resource tracker 50 can redirect MindSpring subscribers to a secondary ISP, such as BellSouth.net.

Instead of, or in addition to, the criteria of access server and ISP, the LRN may be selected based on particular information concerning the subscriber. According to this example, the resource tracker 50 and INTRAC unit 45 direct a subscriber to a preferred resource for that particular subscriber. The RADIUS server 40', as discussed above, contains configuration information on each subscriber to an ISP, including information on the type of service that the subscriber is configured for with the ISP. The INTRAC unit 45 and resource tracker 50 can thus find an access server or ISP that offers the preferred service or resource for that subscriber. As an example, for a subscriber having an X2 modem, the LRN selected by the INTRAC unit 45 and resource tracker 50 directs the subscriber's call to a resource that provide X2 service, rather than the K56Flex service. The INTRAC unit 45 and resource tracker 50 preferably first check the resources of the access server 22 called by the subscriber, followed by other access servers 22 managed by the subscriber's ISP, and then to other ISPs, if enabled, that can offer service for that subscriber. The configuration information used by the INTRAC unit 45 and resource tracker 50 in directing the subscriber's call is not limited to modem type but may encompass other types of information, such as the type of service delivered to the subscriber. Also, additional information may be stored in the RADIUS server 40' and used by resource tracker 50 in directing calls within the PSTN.

The evaluation of the best LRN for a subscriber can be performed by the resource tracker 50, the INTRAC unit 45, or both the resource tracker 50 and INTRAC unit 45. The invention is not limited to having the selection being performed only by the INTRAC unit 45 but instead encompasses the selection being performed by the resource tracker 50 or the selection being shared by the resource tracker 50 and INTRAC unit 45.

According to a further aspect of the invention, the resource tracker 50 automatically sends updates to the INTRAC unit 45 upon a change in resources for an ISP or at a predetermined period of time or set time. In the examples discussed above, the INTRAC unit 45 only receives a response from the resource tracker 50 after the INTRAC unit 45 sends a resource ISP query. The resource tracker 50 may instead update the resource table 43 whenever subscriber begins or ends a session. The resource table 43 for tracking the resources available for an access server or ISP can therefore be connected to the INTRAC unit 45, whereby the INTRAC unit 45 would not query the RADIUS server 40' and resource tracker 50 to determine available network resources.

Data calls, as discussed above, pose a problem to the PSTN in that they have long call durations (LCDs) and consume valuable resources of the PSTN. The LECs experience another problem related to the routing of data calls. The ISPs contend that they are another carrier and are entitled to an access charge for receiving the call from the LEC. Although the validity of this argument is in doubt, the LECs have been placing money into a special account for each call connected to an ISP. A problem to the LEC is that the calls to the ISP are always one-way whereby the LECs cannot charge the ISPs for calls that terminate in the LECs network from the ISP.

The network 100 allows the LEC to redirect data calls off of the PSTN to an alternate interconnection arrangement. Through the arrangement shown in FIG. 3, LECs are now able to not only monitor and better manage calls to the ISPs, but can also meter the length of data calls to an ISP as well as other data calls. Since each start and stop message sent to the RADIUS server 40' is monitored by the resource tracker 50 and since each start or stop message identifies the caller as well as the ISP, the resource tracker 50 may track the total amount of time that calls were connected to an ISP. The resource tracker 50 can track the time in a multitude of ways. As one example, the resource tracker 50 effectively has a timer associated with each call that is directed toward an ISP and starts the timer in conjunction with decrementing the counter at step 84 and stops the timer in conjunction with incrementing the counter at step 86. The times associated with connections to an ISP can be stored in the resource table 43. Alternatively, rather than monitor actual time, the resource tracker 50, INTRAC unit 45, or access servers 22 may monitor the actual payload delivered to the ISP. Furthermore, rather than the resource tracker 50 monitoring the time, the INTRAC unit 45 may monitor the times associated with an ISP and store the times in the resource table 43.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the INTRAC unit 45 preferably resides on the SCP 42 and the resource tracker 50 resides on the RADIUS server 40'. The INTRAC unit 45 and resource tracker 50, however, may comprise separate components distinct from the RADIUS server 40' and SCP 42.

As discussed above with reference to FIG. 4, when resources are not available to handle a subscriber's call, the call is terminated. The invention is not limited in the manner in which the call is terminated. The call, for instance, may be terminated by providing the calling party with a busy signal. One possible way of providing this busy signal is directing the subscriber's call a "dummy" port on the switch which has no trunk group. As another example, the calling party may be played an announcement with this announcement informing the caller that the ISP or other entity that the caller is trying to reach is not able to accept the call.

The invention has been described primarily with reference to a subscriber's call directed to an ISP. The invention, however, is not limited to calls directed to just an ISP but encompasses any data call. The invention, for instance, may be used to control and manage calls to a data network other than the Internet, such as a company's internal computer network.

The INTRAC unit 45, as discussed above, is preferably co-resident with the LNP processing unit 104 on the same SCP 42. By placing the INTRAC unit 45 with the LNP processing unit 104, the LEC can reduce its cost and avoid the need to deploy a set of SCPs dedicated for routing data calls separate from the set of SCPs that provide LNP call processing. The invention is not limited to any particular SCP. For an SCP that has both the LNP processing unit 104 and the INTRAC unit 45, the SCP 42 is preferably a Lucent SCP having a Release 6.9 or higher, such as the Starserver FT Model 3300, although any SCP that allows for the use of Routing Keys with different Sub-System Numbers may be used.

The invention, moreover, is not limited to the PSTN but may be employed in other networks, such as a Private Branch Exchange (PBX). In a PBX, for instance, the INTRAC unit can intelligently route traffic to a certain destinations. The calls that are processed by the INTRAC unit therefore are not limited to just data calls but instead the INTRAC unit may be used in the intelligent routing of voice or other types of calls.

The embodiments were chosen and described in order to explain the principles of the invention and their practical application so as to enable others skilled in the art to utilize the invention and various embodiments and with various modifications as are suited to the particular use contemplated.

What is claimed is:

1. A system for use in routing calls within a telephone network, comprising:

a service control point for receiving a switch-generated query and for generating a resource query, the switch generated query being generated at a switch in response to a received call; and a resource tracker for receiving data generated by a first service provider and for directly monitoring resources of the first service provider;

the data being generated by the first service provider in providing service to its subscribers;

wherein the resource tracker is for receiving the resource query from the service control point and is for providing routing directions for routing the received call, the routing directions being delivered to the switch through the service control point.

2. The system as set forth in claim 1, wherein the switch-generated query is a local number portability query and the service control point is for performing local number portability call processing.

3. The system as set forth in claim 1, wherein the first service provider is an Internet service provider.

4. The system as set forth in claim 1, wherein the resource tracker monitors a number of modems available at the first service provider.

5. The system as set forth in claim 1, wherein the service control point returns the routing directions to the switch as a local routing number.

6. The system as set forth in claim 1, wherein the service control point includes a called party's telephone number in the resource query.

7. The system as set forth in claim 1, wherein the service control point includes a calling party's telephone number in the resource query.

8. The system as set forth in claim 1, wherein the routing directions generated by the resource tracker terminate the call when the first service provider has no available resources.

9. The system as set forth in claim 1, wherein the routing directions generated by the resource tracker directs the received call to available resources of the first service provider.

10. The system as set forth in claim 1, wherein the resource tracker additionally monitors available resources of a second service provider and provides routing directions for directing the received call to the second service provider when resources are not available at the first service provider.

11. The system as set forth in claim 1, wherein resource tracker generates the routing directions based on a called party's telephone number associated with the received call.

12. The system as set forth in claim 1, wherein the resource tracker generates the routing directions based on a calling party's telephone number associated with the received call.

13. The system as set forth in claim 1, wherein the resource tracker generates the routing directions based on a preferred type of service for the received call.

14. The system as set forth in claim 1, wherein the resource tracker includes a counter for tracking available resources of the first service provider.

15. The system as set forth in claim 1, wherein the resource tracker includes a plurality of counters for tracking available resources of the first service provider.

16. The system as set forth in claim 15, wherein each of the counters in the resource tracker is associated with a group of modems at the first service provider.

17. The server as set forth in claim 16, wherein the first service provider has a plurality of modems groups with each group of modems being dedicated to different types of service and the resource tracker having a plurality of counters with each counter monitoring available resources of a respective group of modems.

18. The server as set forth in claim 1, wherein the resource tracker is connected to a remote authentication dial-in user service server and receives the data from the remote authentication dial-in user service server.

19. The system as set forth in claim 18, wherein the resource tracker monitors start and stop messages received at the remote authentication dial-in user service server.

20. The system as set forth in claim 1, wherein resource tracker provides the routing directions as a local routing number.

21. The system as set forth in claim 1, wherein resource tracker resides on a remote authentication dial-in user service server.

22. A method for routing calls within a telephone network, comprising;

receiving a switch-generated query and generating a resource query; the switch generated query being generated at a switch in response to a received call;

receiving data from a first service provider, the data being generated by the first service provider in providing service to its subscribers;

tracking available resources of the first service provider from the data received from the first service provider; and providing routing directions for routing the received call based on the available resources of the first service provider.

23. The method as set forth in claim 22, further including delivering the routing directions to the switch.

24. The method as set forth in claim 22, wherein receiving the switch-generated query comprises receiving a local number portability query.

25. The method as set forth in claim 22, wherein receiving the switch-generated query comprises receiving the switch-generated query at a service control point.

26. The method as set forth in claim 22, wherein tracking available resources comprises tracking available resources of an Internet service provider.

27. The method as set forth in claim 22, wherein tracking available resources comprises tracking modems available for the first service provider.

28. The method as set forth in claim 22, wherein tracking available resources comprises tracking available resources of a second service provider.

29. The method as set forth in claim 22, wherein tracking available resources comprises tracking available modems within each group of modems of the first service provider.

30. The method as set forth in claim 22, wherein tracking comprises tracking resources available within each access server of the first service provider.

31. The method as set forth in claim 22, wherein tracking comprises tracking available resources for each type of service offered by the first service provider.

32. The method as set forth in claim 22, wherein tracking comprises maintaining a counter representing resources available at the first service provider.

33. The method as set forth in claim 22, wherein the comprises maintaining a plurality of counters representing resources available at the first service provider.

34. The method as set forth in claim 22, wherein tracking comprises decrementing a counter each time a resource of the first service provider is consumed.

35. The method as set forth in claim 22, wherein tracking comprises incrementing a counter each time a resource of the first service provider becomes available.

36. The method as set forth in claim 22, wherein providing routing directions comprises terminating the call when resources are not available.

37. The method as set forth in claim 22, wherein providing routing directions comprises directing the call to resources available at the first service provider.

38. The method as set forth in claim 22, further comprising tracking resources of a second service provider and wherein providing routing directions comprises directing the call to the second service provider when resources are not available at the first service provider.

39. The method as set forth in claim 22, wherein providing routing directions directs the call to resources in relative close proximity to the switch.

40. The method as set forth in claim 22, wherein providing routing directions comprises determining a preferred type of service for the call.

41. The method as set forth in claim 22, wherein providing routing directions comprises directing the call to a preferred type of service for the call.

42. The method as set forth in claim 41, wherein directing the call to the preferred type of service comprises directing the call to a second service provider.

43. The method as set forth in claim 22, further comprising routing the call at the switch based on the routing direction.

44. The method as set forth in claim 22, wherein providing routing directions comprises providing routing directions as a local routing number.

45. The system as set forth in claim 1, wherein the resource tracker tracks the available resources of the first service provider by measuring the available resources through the data received from the first service provider.

46. The system as set forth in claim 1, wherein the first service provider is a data network service provider.

47. The system as set forth in claim 1, wherein the resource tracker resides on the service control point, the switch generated query being a local number portability query, and the service control point determining if the query should receive local number portability processing or data call processing.

48. The method as set forth in claim 22, wherein the first service provider comprises a data network service provider and wherein tracking available resources comprises tracking available resources of the data network service provider.

49. A system for use in routing calls within a telephone network, comprising:

a service control point for receiving a switch-generated query and for generating a resource query, the switch-generated query being generated at a switch in response to a received call;

a resource tracker for receiving real-time data from a first service provider, the resource tracker for tracking available resources of the first service provider from the real-time data received from the first service provider;

wherein the resource tracker is for receiving the resource query from the service control point and is for providing routing directions for routing the received call, the routing directions being delivered to the switch through the service control point.

50. The system as set forth in claim 49, wherein the resource tracker receives the real-time data from an authentication server, the authentication server communicating directly with the first service provider.

51. The system as set forth in claim 49, wherein the real-time data received by the resource tracker comprises messages sent by the first service provider at a start of each session and when each session stops.

\* \* \* \* \*